United States Patent [19]
Sturm et al.

[11] Patent Number: 5,232,991
[45] Date of Patent: Aug. 3, 1993

[54] PREPARATION OF AN IMPACT-RESISTANT POLYACRYLATE/VINYL CHLORIDE GRAFT COPOLYMER

[75] Inventors: Harald Sturm, Dorsten; Armin Boebel; Karl-Heinz Prell, both of Marl, all of Fed. Rep. of Germany

[73] Assignee: Huels Aktiengesellschaft, Marl, Fed. Rep. of Germany

[21] Appl. No.: 753,163

[22] Filed: Aug. 30, 1991

[30] Foreign Application Priority Data

Aug. 31, 1990 [DE] Fed. Rep. of Germany ....... 4027640

[51] Int. Cl.⁵ .............................................. C08L 33/06
[52] U.S. Cl. .................................. 525/227; 525/183; 525/192; 525/229; 525/232
[58] Field of Search ............... 525/224, 183, 229, 192, 525/232

[56] References Cited

U.S. PATENT DOCUMENTS 3,988,393 10/1976 Gallagher ............................ 525/226

OTHER PUBLICATIONS

Chemical Abstracts, vol. 106, 1987, p. 10, 106:19188w.

Chemical Abstracts, vol. 97, 1982, p. 34, 97:110839r.

*Primary Examiner*—John Kight, II
*Assistant Examiner*—Duc Truong
*Attorney, Agent, or Firm*—Millen, White, Zelano & Branigan

[57] ABSTRACT

For the preparation of thermoplastic materials based on (a) homopolymers or copolymers of vinyl chloride and (b) polyacrylates having a glass transition temperature of less than $-20°$ C., firstly the acrylate is polymerized in aqueous emulsion in the presence of crosslinking compounds copolymerizable with the acrylates and having at least two nonconjugated double bonds. Secondly, the vinyl chloride or vinyl chloride with up to 20% by weight of copolymerizable monomers is heated with an initiator, a suspension agent system and optionally additives in an aqueous suspension to a temperature of about $\geq 30°$ C. The polyacrylate is subsequently added and polymerization carried out at temperatures of about $>30°$ C. to the desired conversion. The resulting polymers exhibit improved particle size distribution, good reproducibility of the bulk density and in particular caked deposits on the wall are dramatically reduced during polymerization.

10 Claims, No Drawings

PREPARATION OF AN IMPACT-RESISTANT POLYACRYLATE/VINYL CHLORIDE GRAFT COPOLYMER

BACKGROUND OF THE INVENTION

This invention relates to the preparation of thermoplastic materials comprising homopolymers or copolymers of vinyl chloride and polyacrylate polymers as toughening agents.

Processes, according to the prior art, for the preparation of vinyl chloride graft copolymers in suspension on elastomeric polymer particles prepared in emulsion still have some disadvantages.

The preparation of graft polymers in which vinyl chloride is polymerized on polyalkyl acrylates—which serve as toughening agents is known. German Patents 1,082,734, 1,090,856 and 1,090,857 describe processes in which graft polymers containing about 2% to 25% by weight of acrylate rubber are obtained. However, the preparation of such graft polymers results in deposits on the reactor walls which can only be removed with difficulty. The particle size distribution (measured using an air-jet sieve) has a fine fraction below 40 μm and a coarse fraction above 250 μm. The fine fraction leads to turbidity and hence to pollution of the wastewater when the suspension polymer is separated from the aqueous phase. Moreover, dust problems occur during handling of the dry powder. The coarse fractions impair the surface quality of shaped products produced on modern high-speed processing machines.

German Offenlegungsschrift 2,162,615 discloses the preparation of graft polymers of vinyl chloride on polymers of the acrylate type, the final polymers containing 30% to 60% by weight of acrylate units. The acrylates are polymerized in the presence of small amounts of a polyfunctional ethylenically unsaturated monomer in emulsion. An emulsifier having a low HLB value (2 to 12) or a high one (>40), such as, for example, the sodium salt of bis-(tridecyl) sulfosuccinate (HLB=4 to 7) or an alkylsulfate salt having a short alkyl chain, such as sodium 2-ethylhexylsulfate (HLB about 50), should be used for the emulsion polymerization. Vinyl chloride, a suitable suspension agent and an initiator soluble in the monomer are added to the aqueous emulsion of the rubber particles. The pH should be adjusted from 3 to 9. To prevent the formation of wall deposits, a highly viscous methylhydroxypropylcellulose is preferably used. The vinyl chloride graft polymerization is carried out in suspension.

The disadvantage of this process involves the use of the suspension agent which has a high molecular weight and is therefore difficult to handle. Furthermore, the bulk density of the graft polymers is undesirably low for conventional processing methods. In addition, when a mixture is formed with polyvinyl chloride, the resultant extruded products have a comparatively low impact strength and a poor surface on the one hand and a relatively low output rate is obtained for the extrusion process on the other hand.

European Offenlegungsschrift 0,313,507 discloses a process in which there is obtained a polymer having 70% to 40% by weight of polymerized units of vinyl chloride and 30% to 60% by weight of polymerized units of at least one acrylate and optionally other monomers copolymerizable with acrylates. In a first step, in an aqueous emulsion, acrylates and optionally other monomers are reacted with the addition of a monomer having at least two ethylenically unsaturated, nonconjugated double bonds, in the presence of an initiator and of a water-soluble salt of a fatty acid containing 12° to 18° C. atoms as an emulsifier, at an initial pH above 9, to yield a polymer having a glass transition temperature of less than 0° C. In addition to the fatty acid salt, polymerization is carried out in the presence of at least one alkali metal or ammonium salt of an alkylsulfonic acid having 8° to 20° C. atoms and/or of an alkyl acryloylsulfonate having 3° to 16° C. atoms in the alkyl radical.

In a second step, water, a suspension agent, a precipitating agent for the emulsifiers used in the emulsion polymerization, an initiator, optionally further auxiliaries and vinyl chloride are introduced into the polymerization vessel and the aqueous polyacrylate dispersion is added. The precipitating agents are salts of polyvalent metal ions and/or acids, for example, hydrochloric acid, sulfuric acid, nitric acid, citric acid, formic acid or acetic acid are described in EP-OS 0 313 507 as being suitable as precipitating agents for the emulsifiers used in the emulsion polymerization of the acrylic acid alkyl ester. Water soluble alkaline earth or aluminum salts, such as, e.g., magnesium sulfate, calcium chloride, calcium acetate, barium chloride, barium nitrate, aluminum chloride and potassium aluminum sulfate are preferred.

The addition of a second emulsifier and precipitating agent presents problems during normal operation. Furthermore, this necessitates greater expense with regard to storage and filling.

SUMMARY OF THE INVENTION

An object of the present invention is to provide a process and product which do not have the disadvantages of the above-stated processes.

Upon further study of the specification and appended claims, further objects and advantages of this invention will become apparent to those skilled in the art.

The preparation, according to the invention, of the final polymer is generally carried out in two stages. In a first stage, the elastomeric impact modifier is polymerized by emulsion polymerization to produce an emulsion latex of elastomeric particles. For reasons relating to production technology, the emulsion latex generally has a temperature of about 30° to 40° C. Temperatures below 30° C. do not generally occur because of the production and storage temperature.

In a second stage, the monomers forming the matrix are introduced with an initiator, a suspension agent system and optionally additives, and are heated to a temperature of about ≧30° C. Subsequently, in this second stage, the emulsion latex is then added to the aqueous suspension. Usually the addition of the polyacrylate latex takes place at 30° to 45° C. The graft polymerization in the second stage is conducted in the presence of the same emulsifying agent used to make the emulsion latex, i.e., a precipitating agent is not required. This graft copolymerization preferably takes place at about 45° to 70° C. The temperature of the graft copolymerization is dependent on the desired K value.

In the first stage, at least one acrylate is polymerized in aqueous emulsion in the presence of crosslinking compounds copolymerizable with the acrylates and having at least two nonconjugated double bonds.

The polymerization in aqueous emulsion takes place in the presence of emulsification agents which are generally salts, e.g., anionic surfactants.

Suitable acrylates are those which have a glass transition temperature of less than −20° C. in the polymer, and acrylate mixtures or mixtures with copolymerizable monomers can also be used.

The following examples of acrylates include but are not limited to alkyl esters having 2° to 10° C. atoms in the alkyl chain, such as, for example, butyl acrylate, 2-ethylhexyl acrylate, octyl acrylate and similar alkyl acrylates, or alkylaryl acrylates, such as, for example, phenylpropyl acrylate, or acrylic acid polyether esters, such as, for example, phenoxyethoxyethyl acrylate.

The following examples of crosslinking agents include but are not limited to (meth)acrylates of polyhydric alcohols, such as, for example, ethylene glycol dimethacrylate, butylene glycol dimethacrylate, pentaerythritol tetra-acrylate, etc., or allyl methacrylate, or the allyl esters of polybasic acids, such as, for example, diallyl phthalate, diallyl maleate or diallyl fumarate.

The crosslinking compounds are used in amounts of 0.1 to 5.0 parts by weight, based on the organic phase of the first stage, and the amount should be chosen so that the gel content of the particles is 90% or more.

Examples of suitable monomers copolymerizable with the acrylates include but are not limited to styrene, vinyl acetate, methacrylates having 1° to 10° C. atoms and vinyl ether. The molar proportion of such copolymerizate monomers per mol acrylate is generally 0 to 30%.

Examples of emulsification agents include but are not limited to alkali metal salts or the ammonium salts of: fatty acids having 12° to 18° C. atoms, alkylsulfonic acids, or sulfuric acid alkyl half-esters having 12° to 18° C. atoms in the chain, e.g., sodium laurate, sodium laurylsulfonate, sodium dodecylbenzenesulfonate and sodium laurylsulfate. These agents are usually used in amounts of 0.3% to 2.5% by weight, based on the monomer of the first stage.

Conventional compounds, such as ammonium peroxydisulfate, hydrogen peroxide or azo compounds, such as, for example, azobisisobutyronitrile, etc., are used as initiators in the emulsion polymerization, in amounts of from 0.05% to 0.5% by weight, based on the monomer.

If necessary, reducing compounds and metal salts capable of forming a redox system with the initiator are added, such as, for example, alkali metal sulfites, alkali metal aldehyde sulfoxylates, organic acids, such as ascorbic acid, and metal salts, such as, for example, iron sulfate and copper sulfate.

The emulsion polymerization can be carried out batchwise, continuously or semicontinuously. The preferred method is semicontinuous polymerization. In the latter method, some of the water, monomers, emulsifier and initiator (or of the redox system) is introduced at the polymerization temperature of 40° to 90° C. After the polymerization has started, the remaining amount of the reaction mixture is added continuously or batchwise.

The polymerization is generally ended at a conversion of over 99.9%. In the second stage, vinyl chloride or vinyl chloride with up to 20% by weight of copolymerizable monomers is polymerized in aqueous suspension onto the elastomeric particles prepared in the first stage.

To obtain the advantageous properties of the final polymer, it is necessary to prepare a suspension of vinyl chloride in the aqueous phase first and thereafter add the emulsion latex to the suspension. It has been found that the amount of deposits on the reactor walls is dramatically reduced at feed temperatures of above 30° C.

Examples of suitable copolymerizable monomers include but are not limited to: vinyl esters (for example, vinyl acetate and vinyl laurate); vinyl halides (for example, vinylidene chloride); unsaturated acids and anhydrides thereof (for example, fumaric acid and maleic acid); (meth)acrylic acid and esters thereof (mono- and diesters); and imides of maleic acid and its N-derivatives.

Suitable suspension agents are those conventionally employed, such as, for example, hydroxyethylcellulose, hydroxypropylcellulose, methyl hydroxypropylcellulose, polyvinyl alcohols, partially hydrolyzed polyvinyl acetates, copolymers of maleic acid with alkyl vinyl ethers and polyvinylpyrrolidone, either individually or as a mixture. It is also possible to add fatty esters of monohydric or polyhydric alcohols, such as, for example, fatty ethoxylates, sorbitan esters, fatty alcohol ethoxylates, in amounts of from 0.05% to 1.0%. For the esters, typical chain lengths of the acid moieties are 12° to 20° C. atoms; as for alcohols, glycerol or sorbitan are preferably used.

The suspension polymerization is carried out in the presence of free radical initiators which are soluble in vinyl chloride. Examples of these initiators include but are not limited to diacyl peroxides, such as, for example, dilauroyl peroxide or dibenzoyl peroxide, dialkyl peroxides, such as, for example, dicumyl peroxide, peroxyesters, such as, for example, tert-butyl perpivalate or dialkyl peroxydicarbonates having isopropyl, butyl, myristyl, cyclohexyl, etc., as alkyl groups; organic sulfoperacids, such as, for example, acetylcyclohexylsulfonyl peroxide, or azo initiators, such as azobisisobutyronitrile. The conversion of vinyl chloride should be 75 to 95%, based on the vinyl chloride used. At the desired final conversion, the residual monomer is removed, the solid is separated off from the aqueous dispersion, for example by centrifuging, and the solid thus obtained is dried in, for example, pneumatic dryers.

In a procedure according to the invention, in checking the wall deposits, a striking feature is the fact that only a few, easily removable caked deposits adhere to the wall of the polymerization reactor after the polymerization, even after several batches. In a procedure not according to the invention, the polyacrylate latex was added before the vinyl chloride, or after the vinyl chloride but at temperatures below 30° C. The accumulation of caked deposits of up to several centimeters thick which are difficult to remove was dependent on the reactor size. The caked deposits as described substantially hindered heat removal during the polymerization and are observed after only one polymerization batch.

The modified polyvinyl chloride powder obtained in this manner is distinguished by a narrow particle size distribution, high bulk density in conjunction with advantageous porosity and good monomer removal.

The preferred bulk densities depend on the polyacrylate content. If a polymer is produced, which is processed without further mixture with polyvinyl chloride, the bulk density should be at about 650 to 700 g/l. The content fine grain and coarse grain are practically independent of the polyacrylate content. The portions in each case should not exceed 10%.

For polyacrylate contents of up to about 10%, the polymers are processed to shaped products with the addition of conventional processing auxiliaries, pigments and optionally other additives by, for example, extrusion, calendaring, injection molding, etc.

In the case of polyalkyl acrylates contents of up to 40%, mixing with a non-toughened polyvinyl chloride in amounts of 3 to 10%, preferably 5 to 7%, is usually carried out, followed by processing in the above-mentioned manner.

By "non-toughened polyvinyl chloride" is meant polyvinyl chloride which has not been graft polymerized with acrylates or methacrylates, e.g., homopolymers of vinyl chloride and conventional copolymers thereof with vinyl acetate, vinylidene chloride or acrylonitrile.

The shaped products from the polymerization process according to the invention are characterized as having good processability, high impact strength and good surface quality.

The preferred notched tensile impact strength of the shaped products $a_k[kg/m^2]$ is greater than or equal to 30 at K values of 65 to 70.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application Federal Republic of Germany P 40 27 640.6, filed Aug. 31, 1990, are hereby incorporated by reference.

The invention is illustrated below by Examples 1 to 3 and Comparative Examples 1 to 4.

The stated values were determined by the following methods:

| | |
|---|---|
| Gel content of the polyacrylates: | the fraction which is insoluble in tetrahydrofuran; separation by centrifuging; $\frac{Gel\ g}{Polymer\ g} (\times 100)$ |
| Swelling index of the polyacrylate gel: | $\frac{Swollen\ gel\ g}{Dried\ gel\ g}$ (The gel content and swelling index were determined using freeze-dried material) |
| Residual monomer contents: | Head-space gas chromatography |
| K value of the powder: | DIN 53,726 |
| Bulk density: | DIN 53,468 |
| Flowability: | Funnel method (diameter 2 to 16 mm) |
| Particle size distribution: | With air-jet sieve according to DIN 53,734 |
| Plasticizer absorption: | DIN 53,417 |
| Surface of the molding: | Visual assessment |
| Impact strength: | DIN 53,453, notched standard small bar |

EXAMPLE 1 a) Preparation of the Polyacrylate Dispersion

| a) Preparation of the polyacrylate dispersion | | |
|---|---|---|
| | Initially taken mixture parts = kg | Metering parts = kg |
| Demineralized water | 200 = 60 | 100 = 30 |
| Butyl acrylate | — | 99 = 29.7 |
| Allyl methacrylate | — | 1 = 0.3 |
| Ammonium persulfate | 0.04 = 0.012 | 0.06 = 0.01 |
| Lauric acid | 0.36 = 0.108 | 0.54 = 0.16 |
| Sodium hydroxide | 0.083 = 0.025 | 0.123 = 0.13 |

In a 150 liter polymerization reactor equipped with a paddle stirrer, the atmospheric oxygen was displaced by evacuation and flushing with nitrogen gas, and 57 kg of demineralized water, 0.108 kg of lauric acid and 0.025 kg of sodium hydroxide were then introduced and heated to 80° C.

After the solid constituents had dissolved, 12 g of ammonium persulfate dissolved in 3 kg of demineralized water were added, followed by 0.30 kg of the butyl acrylate/allyl methacrylate mixture. The polymerization having been started, after 5 minutes the remaining 29.7 kg of the monomer mixture and at the same time a solution of 0.162 kg of lauric acid, 0.037 kg of NaOH and 0.018 kg of ammonium persulfate in 30 kg of demineralized water were added in the course of four hours. Polymerization was continued for a further two hours.

The following values were determined:

| | |
|---|---|
| Residual monomer content: | <500 ppm (i.e. conversion > 99.95%) |
| Gel content of the solid: | 95% |
| Swelling index: | 5 |
| Solids content: | 25.1% | b) Polymerization of Vinyl Chloride Onto the Polyacrylate

For the subsequent suspension polymerization, the following were introduced into a 235 liter polymerization reactor with an impeller stirrer and heating/cooling jacket:

| | | |
|---|---|---|
| Demineralized water: | 112.1 parts | = 89.4 kg |
| Methylhydroxypropylcellulose: (viscosity 50 mPa.s, 2% strength by weight solution) | 0.16 part | = 0.128 kg |
| Sorbitan monolaurate | 0.12 part | = 0.096 kg |
| Lauryl peroxide | 0.10 part | = 0.080 kg |

The atmospheric oxygen was displaced by evacuation and flushing with nitrogen gas. The following were then added:

| Vinyl chloride: | 94 parts = 75 kg |
|---|---| and after heating to 35° C. (A small portion of the vinyl monomer is polymerized at 35° C. since the initiator is already present in the mixture. The portion of polymerized vinyl chloride was not determined.)

| Polybutyl acrylate latex (19.07 kg) | |
|---|---|
| Solids content: | 6 parts = 4.79 kg |
| Aqueous fraction: | 17.9 parts = 14.28 kg |

The mixture was then heated to the polymerization temperature of 60° C. and polymerization was maintained at this temperature to a vinyl chloride pressure of 3.5 bar. Thereafter, the mixture was cooled, the residual monomer was removed and the solid was separated from the aqueous phase by filtration. The filtrate was clear.

The reactor wall was free from caked deposits.

The solid was dried in a fluidized-bed dryer. The following values were determined:

| Polyacrylate content: | 6.7% by weight (corresponds to a vinyl chloride conversion of 89%) |
|---|---|
| Sieve analysis: | Fraction < 63 μm: 3% |
| | Fraction > 250 μm: 2% |
| Bulk density: | 680 g/l |
| Flowability: | 2 mm |
| Plasticizer absorption: | 8 g/100 g |

Twenty more experiments were carried out in the reactor without cleaning before caked deposits made cleaning necessary, although heat removal was still sufficient.

COMPARATIVE EXAMPLE 1

The polybutyl acrylate latex was prepared as described in Example 1. In the subsequent vinyl chloride graft polymerization, in contrast to Example 1, the latex was added before the vinyl chloride. Working up was similar to Example 1. The filtrate was slightly cloudy.

The reactor wall showed substantial deposits. After three experiments, cleaning was necessary since the heat removal was so greatly impaired by the severe deposits that the internal temperature in the subsequent experiment could no longer have been kept constant.

The following values were determined:

| Polyacrylate content: | 6.7% by weight |
|---|---|
| Sieve analysis: | Fraction < 63 μm: 9% |
| | Fraction > 250 μm: 12% |
| Bulk density: | 640 g/l |
| Flowability: | 2 mm . |
| Plasticizer absorption: | 6 g/100 g |

COMPARATIVE EXAMPLE 2

The polybutyl acrylate latex was prepared as described in Example 1. In the subsequent vinyl chloride graft polymerization, the only difference as compared with Example 1 was that the latex was added to the vinyl chloride-containing batch at 25° C. The reactor wall showed fewer caked deposits that in Comparative Example 1 but more than in Example 1. Six polymerization experiments could thus be carried out without intermediate cleaning.

The following values were determined:

| Polyacrylate content: | 6.7% by weight |
|---|---|
| Sieve analysis: | Fraction < 63 μm: 5% |
| | Fraction > 250 μm: 3% |
| Bulk density: | 680 g/l |
| Flowability: | 2 mm |
| Plasticizer absorption: | 7 g/100 g |

EXAMPLE 2

The procedure was as in Example 1, except that 11 parts (solid) of the polybutyl acrylate latex were added at 32° C. to 89 parts of vinyl chloride in demineralized water/suspension agent. The cellulose content was 0.20% ∧ =0.16 kg.

After drying, a powder having the following values was obtained:

| Polyacrylate content: | 12.2% by weight |
|---|---|
| Sieve analysis: | Fraction < 63 μm: 4% |
| | Fraction > 250 μm: 2% |
| Bulk density: | 650 g/l |
| Flowability: | 2 mm |
| Plasticizer absorption: | 6 g/100 g |

Twelve more experiments were carried out without cleaning before the caked deposits became too severe.

COMPARATIVE EXAMPLE 3

The procedure was as in Example 2, except that the latex was added at 20° C. The following values were determined:

| Polyacrylate content: | 12.2% by weight |
|---|---|
| Sieve analysis: | Fraction < 63 230 m: 5% |
| | Fraction > 250 μm: 4% |
| Bulk density: | 630 g/l |

The flowability and the plasticizer absorption were similar to Example 2.

Four more experiments were carried out without cleaning.

EXAMPLE 3

The procedure was as in Example 1, except that 35 parts (solid) of polybutyl acrylate latex were added at 32° C. to 89 parts of vinyl chloride in demineralized water/suspension agent. The cellulose content was 0.40%.

After drying a powder having the following values was obtained:

| Polyacrylate content: | 38% by weight |
|---|---|
| Sieve analysis: | Fraction < 63 μm: 8% |
| | Fraction > 250 μm: 3% |
| Bulk density: | 520 g/l |
| Flowability: | 2 mm |
| Plasticizer absorption: | 25 g/100 g |

Four more experiments were carried out without intermediate cleaning.

COMPARATIVE EXAMPLE 4

The procedure was as in Example 3, except that the latex was added before the vinyl chloride.

After drying, a powder having the following values was obtained:

| Polyacrylate content: | 38% by weight |
|---|---|
| Sieve analysis: | Fraction < 63 μm: 17% |
| Bulk density: | 380 g/l |
| Flowability: | 12 mm |
| Plasticizer absorption: | 50 g/100 g |

Cleaning had to be carried out after each polymerization experiment.

The powders of Examples 1 to 3 and of Comparative Examples 1 to 4 were processed in an extruder with the addition of commercial formulation components. The polyacrylate contents were necessarily adjusted by the addition of a commercial suspension PVC (K value 68) to 6.7%, based on PVC plus polyacrylate +100.

Profile samples were produced and their surfaces were visually assessed. Test specimens for the notched impact test were produced as follows:

|  | Surface | $a_k$ kg/m² |
|---|---|---|
| Example |  |  |
| 1 | glossy | 40 |
| 2 | glossy | 42 |
| 3 | glossy, slightly matt | 38 |
| Comp. Example |  |  |
| 1 | glossy | 34 |
| 2 | glossy | 38 |
| 3 | glossy | 38 |
| 4 | matt/striped | 15 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the preparation of thermoplastic materials based on homopolymers or copolymers of vinyl chloride and based on polyacrylates, comprising the steps of: (a) polymerizing in an aqueous emulsion (A) at least one acrylate and (B) a crosslinking agent copolymerizable with the acrylate and having at least two nonconjugated double bonds, resulting in polyacrylate latex of an acrylate polymer having a glass transition temperature of less than −20° C.; (b) adding to a reaction vessel an aqueous suspension of vinyl chloride with up to 20% by weight of copolymerizable monomer, at least one initiator and at least one suspension agent and heating said suspension to a temperature of about ≧30° C.; (c) subsequently adding the polyacrylate latex of step (a) to resultant product of step (b) already in the reaction vessel; and (d) graft copolymerizing at temperatures greater than about 30° C. to the desired conversion, whereby caking on walls of the reaction vessel is substantially diminished.

2. A process according to claim 1, wherein the graft copolymerizing step (d) is conducted without precipitating the emulsifying agent employed in step (a).

3. A process as claimed in claim 1, wherein step (a) is conducted in the presence of an emulsifier comprising from 0.3 to 2.5% by weight relative to the monomer of step (a).

4. A process as claimed in claim 1, wherein the suspension agent comprises a fatty ester of a monohydric or polyhydric alcohol selected from a group consisting of fatty ethoxylates, a sorbitan ester or fatty alcohol ethoxylate.

5. A process as claimed in claim 1, wherein the suspension agent comprises from 0.05 to 1.0% by weight.

6. A process as claimed in claim 1, wherein the initiator is azoisobutyronitrile.

7. A process as claimed in claim 1, wherein the polymer particles resulting from step (d) have a particle size of 90% more than 63 μm and less than 250 μm.

8. A process as claimed in claim 1, wherein the polymer particles resulting from step (d) have a bulk density of about 650 to 700 g/l.

9. A process as claimed in claim 1, wherein the step (d) is conducted at about 45°–70° C.

10. A process for the preparation of thermoplastic materials based on homopolymers or copolymers of vinyl chloride and based on polyacrylates, comprising the steps of: (a) adding to a reaction vessel an aqueous suspension of at least one homopolymer of vinyl chloride or copolymer of vinyl chloride with up to 20% by weight of copolymerizable monomer, at least one initiator and at least one suspension agent, and heating said suspension to a temperature of about ≧30° C.; (b) subsequently adding a crosslinked polyacrylate latex, said crosslinked polyacrylate having a glass transition temperature of less than −20° C. to resultant product of step (b) already in the reaction vessel; and (c) graft copolymerizing at temperatures greater than about 30° C. to the desired conversion, whereby caking on walls of the reaction vessel is substantially diminished.

* * * * *